(12) United States Patent
Chen et al.

(10) Patent No.: US 11,809,966 B2
(45) Date of Patent: Nov. 7, 2023

(54) COMPUTER MODEL MACHINE LEARNING BASED ON CORRELATIONS OF TRAINING DATA WITH PERFORMANCE TRENDS

(71) Applicant: International Business Machines Corporation, Armonk, NY (US)

(72) Inventors: Hanqing Chen, San Jose, CA (US); Abhinandan Kelgere Ramesh, San Jose, CA (US); Ramani Routray, San Jose, CA (US); Robert Ip, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 1273 days.

(21) Appl. No.: 16/295,062

(22) Filed: Mar. 7, 2019

(65) Prior Publication Data

US 2020/0285899 A1 Sep. 10, 2020

(51) Int. Cl.
*G06N 20/00* (2019.01)
*G06F 16/901* (2019.01)
(Continued)

(52) U.S. Cl.
CPC ........... *G06N 20/00* (2019.01); *G06F 16/901* (2019.01); *G06F 17/15* (2013.01); *G06F 18/2148* (2023.01); *G06N 5/04* (2013.01)

(58) Field of Classification Search
CPC .................................................. G06N 20/00
(Continued)

(56) References Cited

U.S. PATENT DOCUMENTS 6,879,944 B1  4/2005  Tipping et al.
8,849,622 B2  9/2014  Melkumyan et al.
(Continued)

FOREIGN PATENT DOCUMENTS

CN   104598981 A   5/2015
CN   106663037 A   5/2017
(Continued)

OTHER PUBLICATIONS

International Search Report and Written Opinion dated Jun. 11, 2020 for International Application No. PCT/IB2020/051708, 10 pages.

(Continued)

*Primary Examiner* — Syling Yen
(74) *Attorney, Agent, or Firm* — Stephen J. Walder, Jr.; Aaron Pontikos

(57) ABSTRACT

Mechanisms are provided for training a computer implemented model. The mechanisms perform multiple instances of training of the computer implemented model, where each instance of training of the computer implemented model comprises training the computer implemented model using a different training data set to generate a different instance of a trained computer implemented model. The mechanisms generate computer implemented model results after each instance of training by executing the corresponding instance of the trained computer implemented model. The mechanisms record differences in the instances of training of the computer implemented model in association with corresponding identifiers of the instances of trained computer implemented model and corresponding computer implemented model results. The mechanisms analyze the recorded differences and the corresponding computer implemented model results, and generate an output indicating a correla- (Continued)

tion between recorded differences and corresponding computer implemented model results.

17 Claims, 6 Drawing Sheets

(51) Int. Cl.
    *G06N 5/04*         (2023.01)
    *G06F 17/15*       (2006.01)
    *G06F 18/214*     (2023.01)

(58) Field of Classification Search
    USPC ........................................................ 707/791
    See application file for complete search history.

(56) References Cited

U.S. PATENT DOCUMENTS

| | | | |
|---|---|---|---|
| 9,454,733 | B1 | 9/2016 | Purpura et al. |
| 10,528,891 | B1* | 1/2020 | Cheng ................... G06F 17/10 |
| 11,334,813 | B2 | 5/2022 | Ura et al. |
| 2002/0169652 | A1 | 11/2002 | Busche |
| 2010/0174514 | A1 | 7/2010 | Melkumyan et al. |
| 2011/0125734 | A1 | 5/2011 | Duboue et al. |
| 2011/0270779 | A1* | 11/2011 | Showalter ............. G06Q 40/02 |
| | | | 705/36 R |
| 2015/0019464 | A1 | 1/2015 | Nguyen-Tuong et al. |
| 2016/0358099 | A1 | 12/2016 | Sturlaugson et al. |
| 2018/0025286 | A1 | 1/2018 | Gorelik et al. |
| 2018/0300792 | A1 | 10/2018 | Dhurandhar et al. |
| 2018/0373979 | A1 | 12/2018 | Wang et al. |
| 2020/0012935 | A1* | 1/2020 | Goodsitt .................. G06N 7/00 |
| 2020/0226496 | A1* | 7/2020 | Basu ........................ G06N 5/01 |

FOREIGN PATENT DOCUMENTS

| | | |
|---|---|---|
| CN | 109189767 A | 1/2019 |
| JP | 2017004509 A | 1/2017 |
| JP | 2017228068 A | 12/2017 |

OTHER PUBLICATIONS

UK Examination Report under Section 18(3) dated Nov. 19, 2021 for Application No. GB2112847.5, 7 pages.
Anonymous, "Identifying Sources of a Change in Metrics of a Stack of Servers", IP.com Prior Art Database Technical Disclosure, IP.com No. IPCOM000252099D, Dec. 15, 2017, 34 pages.
Anonymous, "Semi-Supervised Classification Using Object Metadata", IP.com Prior Art Database Technical Disclosure, IP.com No. IPCOM000252345D, Jan. 5, 2018, 34 pages.
Anonymous, "User Interface and Application Programming Interface for Explaining Personalized Machine-Learned Model Outputs", IP.com Prior Art Database Technical Disclosure, IP.com No. IPCOM000252271D, Jan. 3, 2018, 34 pages.
Diaz, G.I. et al., "An effective algorithm for hyperparamter optimization of neural networks", IBM Journal of Research and Development, vol. 61, No. 4/5, Jul.-Sep. 2017, pp. 1-20.
High, Rob, "The Era of Cognitive Systems: An Inside Look at IBM Watson and How it Works", IBM Corporation, Redbooks, Dec. 12, 2012, 16 pages.
Kinnison, Jeffery et al., "SHADHO: Massively Scalable Hardware-Aware Distributed Hyperparameter Optimization", 2018 IEEE Winter Conference on Applications of Computer Vision (WACV), Mar. 2018, 10 pages.
Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.
JP Notice of Reasons for Refusal dated Jul. 6, 2023 for Japanese Patent Application No. 2021-547725, 3 pages.

* cited by examiner

| SERVICENAME | NUMBERS | PUBDATE | DEV_ACC | SB_ACC | DB_ACC | DEV_ACC_DETAILS | MODEL_ID | ... | DETAILS | TREND |
|---|---|---|---|---|---|---|---|---|---|---|
| > AE | 4 | | | | | | | | | |
| SERIOUSNESS | | 2018-01-09T... | 0.786 | 0.674 | 0.641 | TP=48, TN=139, FP=20, FN=31 | 8005 | ... | ⊡ | ⊘ |
| MEDRA_CODE | | 2017-10-17T... | 0.945 | 098099 | 0.98056 | TP=NULL, TN=NULL, FP=NULL, FN=NULL | 5264 | ... | ⊡ | ⊘ |
| SERIOUSNESS CATEGORY | | 2018-01-05T... | 0.755 | 0.464 | 0.471 | TP=NULL, TN=NULL, FP=NULL, FN=NULL | 7816 | ... | ⊡ | ⊘ |
| OUTCOME_ ANNOTATION | | 208-01-29T... | 0.65497 | NEED EVAL | EXCLUDE | TP=56, TN=NONE, FP=13, FN=46 | 8849 | ... | ⊡ | ⊘ |
| > PATIENT | 1 | | | | | | | | | |
| HEIGHT_ANN. | | 2018-01-25T... | 0.72605 | EXCLUDE | NEED EVAL | TP=269, TN=NONE, FP=102, FN=101 | 8742 | ... | ⊡ | ⊘ |
| > REPORTER | 0 | | | | | | | | | |
| > PRODUCT | 3 | | | | | | | | | |
| PRODUCTSTART DATE_ANN. | | 2018-01-23T... | 0.67234 | NEED EVAL | EXCLUDE | TP=79, TN=NONE, FP=24, FN=53 | 8678 | ... | ⊡ | ⊘ |
| WHO_DD_CODE | | 2017-09-08T... | NULL | 0.925 | 0.926 | TP=N/A, TN=N/A, FP=N/A, FN=N/A | 3036 | ... | ⊡ | ⊘ |
| PRODUCTSTOP DATE_ANN. | | 2018-01-22T... | 0.59813 | NEED EVAL | EXCLUDE | TP=N/A, TN=N/A, FP=N/A, FN=N/A | 8631 | ... | ⊡ | ⊘ |
| ... | | | | | | | | | | |

*FIG. 4*

SERVICENAME=ADVERSE_EVENT_ANNOTATION, MODEL_ID=7255

| DEV_TRAINING_DATA | SINGLE_BLIND_DATA | DOUBLE_BLIND_DATA | TECHN. | MODELTYPE | DB_ACC | ENVIRONMENT | TRACE FILES |
|---|---|---|---|---|---|---|---|
| STORE_ID=/WATSON/ CELGENE/ NCHAKRAP_WORKSP ACE/BATCH0- 17_CLAD_AEV/, CLAD_INSTANCES=45 54 | STORE_ID=6648, CLAD_INST= 1308 | STORE_ID=6644, CLAD_INST=1415 | TENSOR FLOW/KERAS | ANNOTATION | START=2017-12-04... END=2017-12-04... DURATION(MINS) = 0:13... | SERVER= N/A, GPU=N/A, CPU=N/A, MAX_MEMORY=N/A | LINK |

| HYPERPARAMETERS | VALUE |
|---|---|
| CHAR_EMBEDDING_DIM | 25 |
| USE_POS_EMBEDDINGS | N/A |
| PRETRAINED_CHAR_EMBEDDINGS | N/A |
| ACTIVATION | RELU |
| BATCH_SIZE | 256 |
| USE_WORD_EMBEDDINGS | 1 |
| PRETRAINED_WORD_EMBEDDINGS | /WATSO/CELGEN/ WORD_EMBEDDINGS/... |
| NUMBER_OF_LSTM_CELLS | 100 |
| MAX_SEN_LENGTH | 100 |
| DROPOUT_RATE | 0.5 |
| USE_CHAR_EMBEDDINGS | N/A |
| ... | ... |

FIG. 6

COMPUTER MODEL MACHINE LEARNING BASED ON CORRELATIONS OF TRAINING DATA WITH PERFORMANCE TRENDS

BACKGROUND

The present application relates generally to an improved data processing apparatus and method and more specifically to mechanisms for performing computer model machine learning based on correlations of training data with performance trends.

A computer model, or computer simulation, is a computer program that is designed to simulate what might, or what did, happen in a situation by simulating an object or system in the physical world, where this object or system may be of various types including biological objects/systems, computer objects/systems, environmental objects/systems, mechanical objects/systems, or any other object or system that may exist in the physical world. Computer models, or computer simulations, are used in many ways including in astronomy, economics, and various fields of science such as physics and biology. Many modern computer models, or computer simulations, utilize training operations based on machine learning approaches, to train the computer models, or computer simulations, to properly predict the behavior of the object or systems.

Machine learning (ML) is the scientific study of algorithms and statistical models that computer systems use to progressively improve their performance on a specific task. Machine learning algorithms build a mathematical model of sample data, known as "training data", in order to make predictions or decisions without being explicitly programmed to perform the task. Machine learning algorithms are used in the applications of email filtering, detection of network intruders, and computer vision, where it is infeasible to develop an algorithm of specific instructions for performing the task. Machine learning is closely related to computational statistics, which focuses on making predictions using computers. Data mining is a field of study within machine learning, and focuses on exploratory data analysis through unsupervised learning. In its application across business problems, machine learning is also referred to as predictive analytics.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for training a computer implemented model. The method comprises performing, by the data processing system, multiple instances of training of the computer implemented model, where each instance of training of the computer implemented model comprises training the computer implemented model using a different training data set to generate a different instance of a trained computer implemented model. The method further comprises generating computer implemented model results after each instance of training by executing the corresponding instance of the trained computer implemented model. In addition, the method comprises recording, by the data processing system, differences in the instances of training of the computer implemented model in association with corresponding identifiers of the instances of trained computer implemented model and corresponding computer implemented model results. Furthermore, the method comprises analyzing, by the data processing system, the recorded differences and the corresponding computer implemented model results, and generating, by the data processing system, an output indicating a correlation between recorded differences and corresponding computer implemented model results.

In one illustrative embodiment, performing multiple instances of training of the computer implemented model comprises executing, by the data processing system, a first training operation on the computer implemented model using a first version of training data and a first set of one or more hyperparameters to generate a first trained instance of the computer implemented model, and executing, by the data processing system, a second training operation on the computer implemented model using a second version of the training data and a second set of one or more hyperparameters to generate a second trained instance of the computer implemented model. By training different instances of the computer implemented model with different versions of training data and hyperparameters, the illustrative embodiments are able to identify and correlate trends in performance of computer models with particular training data sets and hyperparameter settings.

In some illustrative embodiments, recording changes in the instances of training of the computer implemented model comprises generating, by the data processing system, a first tracking data structure that correlates a first identifier of the first training operation with the first version of training data and the first set of one or more hyperparameters, and generating, by the data processing system, a second tracking data structure that correlates a second identifier of the second training operation with the second version of training data and the second set of one or more hyperparameters. In some illustrative embodiments, generating the computer implemented model results comprises generating first model results from executing the first instance of the computer implemented model, and generating second model results from executing the second instance of the computer implemented model, where analyzing the recorded differences and the corresponding computer implemented model results comprises performing, by the data processing system, analytics on the first tracking data structure, second tracking data structure, first model results, and second model results to identify differences between the first training operation and the second training operation, that correlate with differences between the first model results and the second model results. Again, these operations serve to correlate differences in training with differences in model results so that appropriate selection of training characteristics to achieve a desired performance can be identified.

In some illustrative embodiments, the second version of training data is a modified version of the first version of training data. In this way, the mechanism of the illustrative embodiments can determine what changes in the first version of training data improve or decrease performance of the computer model.

In some illustrative embodiments, generating the output further comprises generating one or more recommendations for modifying training of the computer implemented model to improve training data by identifying what changes increase the accuracy of the computer implemented model based on the recorded differences and corresponding computer implemented model results. Furthermore, in some illustrative embodiments, computer operations are automatically executed to implement the generated one or more recommendations, where the computer operations comprise at least one of obtaining new training data comprising entities specified in the one or more recommendations as entities that improve training of the computer implemented model, removing entities, specified in the one or more recommendations as entities that degrade training of the computer implemented model, modifying at least one hyperparameter of the computer implemented model, or modifying a computer model training tool used to perform training of the computer implemented model. In this way, the training of a computer model may be automatically improved based on the trend analysis performed by the illustrative embodiments.

In some illustrative embodiments, instances of training data used to train the computer implemented model are tracked so that training data used to train the computer implemented model may be reverted back to a previous version of training data. Thus, with these mechanisms, if a change in the training of a computer model results in unwanted performance changes, then the changes made to the training may be reverted to ensure optimum training of the computer model to achieve a desired performance.

In some illustrate embodiments, the analysis comprises performing a trend analysis on the recorded differences and the corresponding computer implemented model results. This trend analysis allows for the determination of projections of changes of training data and corresponding changes in performance so as to direct efforts to modify the training of a computer model to achieve a desired or optimum performance.

In some illustrative embodiments, the multiple instances of training of the computer implemented model comprises training different copies of the computer implemented model by different computer implemented model developers at one or more locations, to generate different subsets of instances of the trained computer implemented model, and wherein the method is performed across all the subsets of instances of the trained implemented model from the different computer implemented model developers. Thus, with the mechanisms of the illustrative embodiments, the individual training of instances of a computer model performed by multiple different model developers may be used to assist other developers in achieving greater performance out of their own instances of the computer model.

In other illustrative embodiments, a computer program product comprising a computer useable or readable medium having a computer readable program is provided. The computer readable program, when executed on a computing device, causes the computing device to perform various ones of, and combinations of, the operations outlined above with regard to one or more of the method illustrative embodiments.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the one or more of the method illustrative embodiments.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an example diagram of a dashboard representation of training information in accordance with one illustrative embodiment;

FIG. 6 is an example diagram of the tabular representation of the training model characteristics and training dataset characteristics in accordance with one illustrative embodiment.

DETAILED DESCRIPTION

Figure 1:
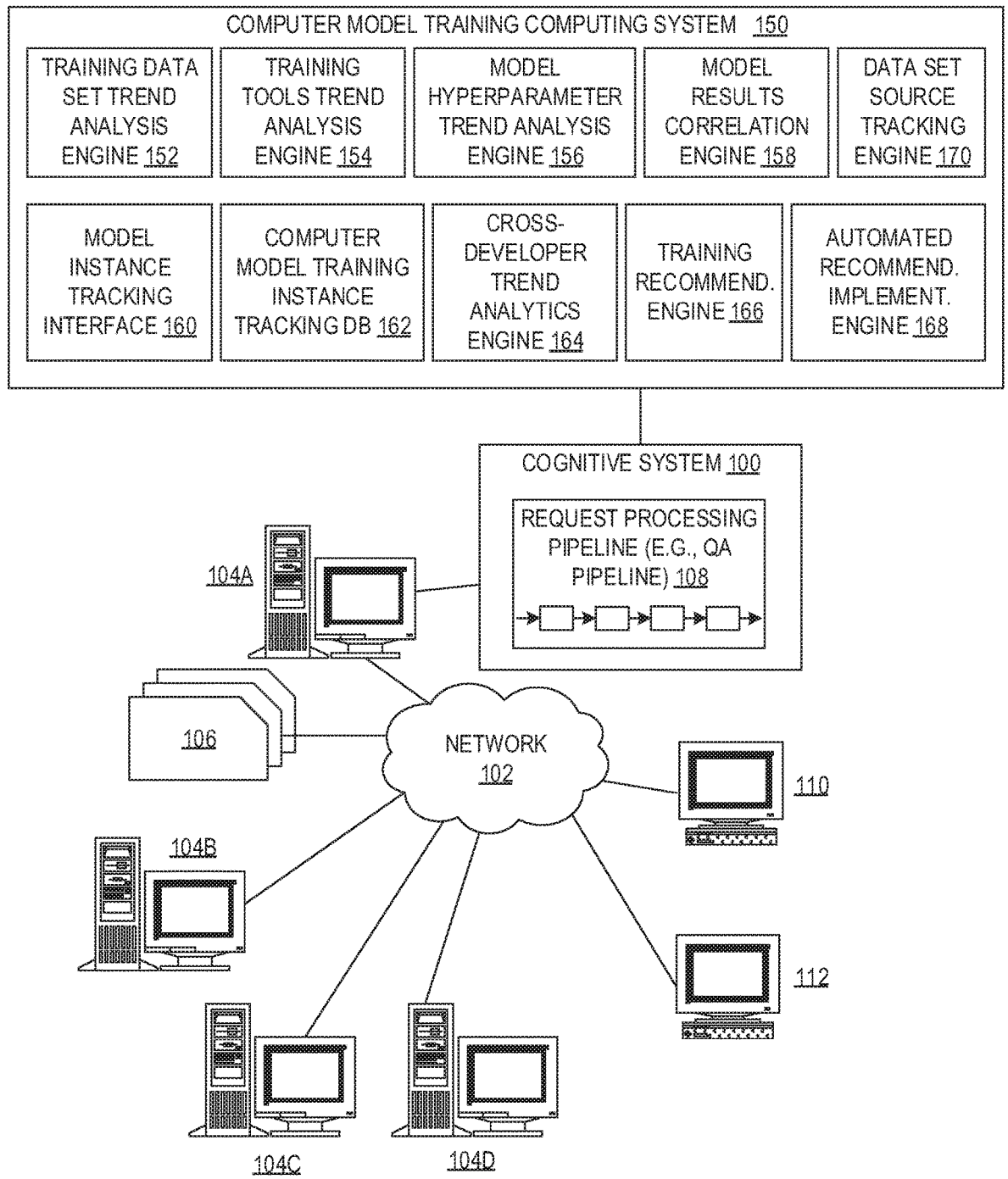
FIG. 1 is a block diagram of one illustrative embodiment of a distributed computing system in which aspects of the illustrative embodiments may be implemented.

The illustrative embodiments provide mechanisms for performing computer model machine learning based on correlations of training data with performance trends. The present invention is specifically directed to an improvement to computer tools for training computer models so as to improve the performance and accuracy of these computer models based on observations of changes in training data, training tools, hyperparameters, and the like, and the corresponding trends in performance and accuracy of the computer models based on these changes. In this way, improvements are provided to computer model training which in turn results in improved performance and accuracy of the computer models.

As noted above, computer models are utilized to simulate or predict the way in which various objects or systems will operate in response to particular stimuli or to perform analytics to determine why particular objects or systems operated in the way that they did. While computer models provide an excellent tool for performing analytics and predictive modeling, their performance and accuracy are often dependent upon the quality of the training of the computer model, which itself is dependent upon the particular training data utilized to perform the training.

Moreover, in modern computer modeling, such computer models are often trained using a machine learning training operation in which such training data is used as a basis for modifying the operation of the computer model to improve the performance and accuracy of the computer model. That is, in one type of machine learning approach, sometimes referred to as unsupervised machine learning, the machine learning utilizes training data in which a correct output of the computer model, or a "ground truth", is known a priori and is the basis against which the actual output of the computer model is compared to determine how well the computer model performs. Based on the difference between the output of the computer model and the ground truth, the error in the computer model is determined and operating parameters associated with the computer model are modified to reduce this error. This process may be performed iteratively until the error is determined to be at or below an acceptable tolerance, e.g., a threshold level of error, or loss in the model.

Other types of machine learning, sometimes referred to as supervised machine learning, involve human beings, such as subject matter experts, informing the computer model of the accuracy or inaccuracy of the results it generates and/or modifications to operating parameters to be implemented. For example, a subject matter expert (SME) may get an output from a computer model, and may manually make adjustments to the operating parameters, training data, or the like, and may then run the computer model again to see if an improvement in performance is achieved.

It can be appreciated that the training of these computer models is highly dependent upon the training data utilized, the training tools utilized, and the particular settings of the operating parameters of the computer model, e.g., hyperparameters of the computer model, where hyperparameters are operating parameters of a computer model that are fixed prior to the machine learning process. Such hyperparameters are often set based on subject matter expert knowledge and are static during a machine learning training process.

In order to attempt to obtain improved performance and accuracy of computer models, human developers involved in the training of the computer model may make modifications to the training data, training tools, hyperparameters, and the like, to attempt to make the model achieve a desired performance or accuracy. For example, consider a scenario in which a human developer is training and learning about the operation of a computer model on the fly and making modifications to training data, hyperparameters, training tools, and the like, potentially with the assistance of subject matter experts. The developer may use multiple tools, several types of hyperparameters, and may modify training data to obtain various results. During this process, the developer determines that the ground truth is incorrect and obtains a new one, i.e. a new version of the training data is obtained. Now, the developer goes back through the training process again. For each training data set, the developer may apply different tools, different hyperparameters, and get different results.

A problem with this training process is being able to track and correlate the changes made with differences in performance and accuracy of the computer model. That is, how does the developer keep track of the changes made and the correspondence with changes to performance and accuracy of the computer model in order to identify anomalies, trends, etc., and determine what changes correspond to improved or worsening performance and accuracy of the computer model. Moreover, this problem is exacerbated when multiple instances of the same computer model are distributed to different developers, each independently performing such modifications and trainings of their own individual instances of the computer model.

With the mechanisms of the illustrative embodiments, as a developer makes changes and updates the training of a computer model (referred to hereafter as simply a "model"), additions/deletions/modifications in the training data that affect the performance and accuracy of the computer model are tracked, e.g., what entities were added, what entities were deleted, what entities were modified. Analytics are executed on top of the tracked data to identify trends in the training data and the corresponding performance and accuracy of the model. This process may be repeated for repeated training sessions with the model and for different training data sets, different training tools, and different hyperparameter settings. For example, a developer may run the computer model on new training data on a daily basis and may obtain updates of the accuracies of the computer model which may lead to identified trends which can be correlated with the changes in the training data.

Based on the identified trends, the mechanisms of the illustrative embodiments may generate recommendations as to how to improve the training data by identifying what changes increase the accuracy of the models, e.g., including more entities like X will increase the accuracy of the model. Such recommendations may then be output to the developer along with recommendations of changes not to make, i.e. changes that resulted in lower accuracy or performance of the model. In some illustrative embodiments, the recommendations generated by the mechanisms of the illustrative embodiments may be used to automatically search for other training data sets in one or more training data set repositories, which may include entities that are determined to improve the accuracy and/or performance of the computer model. In still some embodiments, the automatically identified training data sets may be automatically retrieved and used to train the computer model. This process may be repeated until a desired accuracy or performance of the computer model is achieved or until a determination that no further improvement is possible based on the available training data sets, tools, etc.

This tracking and correlation to identify trends, anomalies, etc., may be performed across different computer model instances, different developers, and the like. Thus, a first developer at a customer A using a first instance of the computer model may make their own independent training data set changes, operating parameter changes, etc., and this information and correlations with performance/accuracy of the first computer model instance are tracked and reported to a centralized computing system. A second developer at a customer B using a second instance of the computer model may make their own independent training data set changes, operating parameter changes, etc. and this information and correlations with performance/accuracy of the second computer model instance are tracked and reported to the centralized computing system. The mechanisms of the illustrative embodiments may perform analytics on all the reported information for both the first and second computer model instances, and generate trend information which may be used to make recommendations for improving computer model performance and accuracy.

In some illustrative embodiments, version tracking for training data is provided such that, if needed, previous versions of training data may be recreated. That is, a mapping of the training data formatted for use by the model, to the originally received training data, is maintained. In this way, given the model formatted training data, the originally received training data may be recreated. Thus, the mechanisms of the illustrative embodiment can correlate a version of training data obtained from a customer with the version of data generated for consumption of the computer model, and can return to the customer data via the tracking of the versioning so that the earlier version can be reproduced.

Thus, with the mechanisms of the illustrative embodiments, a computer methodology is provided for training a computer implemented model, where this computer methodology is implemented in a data processing system that is specifically configured to perform an ordered combination of computer specific operations to train a computer model and track the changes made to the training as well as correlate the changes made to the training with performance/ accuracy metrics. The computer methodology further provides computer specific operations that identify trends in the tracked information and which perform analysis to generate recommendations for improving the training of the computer implemented model and/or automatically implementing the generated recommendations for improving the training of the computer implemented model.

In one illustrative embodiment, the computer methodology includes performing, by the specifically configured data processing system, multiple instances of training of the computer implemented model, each instance of training of the computer implemented model including training the computer implemented model using a different training data set to generate a different instance of a trained computer implemented model than other instances of training of the computer implemented model. The computer methodology further includes generating computer implemented model results after each instance of training by executing the corresponding instance of the trained computer implemented model. Moreover, the computer methodology includes recording, by the data processing system, differences in the instances of training of the computer implemented model in association with corresponding identifiers of the instances of trained computer implemented model and corresponding computer implemented model results. The computer methodology further includes analyzing, by the data processing system, the recorded differences and the corresponding computer implemented model results, and generating, by the data processing system, an output indicating a correlation between recorded differences and corresponding computer implemented model results.

In some illustrative embodiments, the computer methodology performs multiple instances of training of the computer implemented model at least by executing, by the data processing system, a first training operation on the computer implemented model using a first version of training data and a first set of one or more hyperparameters to generate a first trained instance of the computer implemented model. The computer methodology further performs the multiple instances of training of the computer implemented model by executing, by the data processing system, a second training operation on the computer implemented model using a second version of the training data and a second set of one or more hyperparameters to generate a second trained instance of the computer implemented model.

In some illustrative embodiments, the computer methodology records changes in the instances of training of the computer implemented model at least by generating, by the data processing system, a first tracking data structure that correlates a first identifier of the first training operation with the first version of training data and the first set of one or more hyperparameters, and generating, by the data processing system, a second tracking data structure that correlates a second identifier of the second training operation with the second version of training data and the second set of one or more hyperparameters. In some illustrative embodiments, the computer methodology generates computer implemented model results at least by generating first model results from executing the first instance of the computer implemented model, and generates second model results from executing the second instance of the computer implemented model. In such illustrative embodiments, the analysis of the recorded differences and the corresponding computer implemented model results includes performing, by the data processing system, analytics on the first tracking data structure, second tracking data structure, first model results, and second model results to identify differences between the first training operation and the second training operation, that correlate with differences between the first model results and the second model results.

In some illustrative embodiments, the second version of training data is a modified version of the first version of training data. In some illustrative embodiments, the computer methodology generates the output at least by generating recommendations for modifying training of the computer implemented model to improve training data by identifying what changes increase the accuracy of the computer implemented model based on the recorded differences and corresponding computer implemented model results. In some illustrative computer operations are automatically executed to implement the generated one or more recommendations, where the computer operations comprise at least one of obtaining new training data comprising entities specified in the one or more recommendations as entities that improve training of the computer implemented model, removing entities, specified in the one or more recommendations as entities that degrade training of the computer implemented model, modifying at least one hyperparameter of the computer implemented model, or modifying a computer model training tool used to perform training of the computer implemented model.

In some illustrative embodiments, the computer methodology includes tracking instances of training data used to train the computer implemented model so that training data used to train the computer implemented model may be reverted back to a previous version of training data. In still other illustrative embodiments, the computer methodology includes performing a trend analysis on the recorded differences and the corresponding computer implemented model results. In still further illustrative embodiments, the multiple instances of training of the computer implemented model include training different copies of the computer implemented model by different computer implemented model developers at one or more locations, to generate different subsets of instances of the trained computer implemented model, and wherein the method is performed across all the subsets of instances of the trained implemented model from the different computer implemented model developers.

Hence, with the mechanisms of the illustrative embodiments, an automated computer tool is provided that automatically tracks and correlates changes in training of an instance of a computer model with changes in performance/accuracy of the instance of the computer model. Trend analytics are executed automatically by the computer tool on the tracked information, which may be tracked for a single instance of a computer model, or across multiple instances of the same or different computer models subjected to different training processes. The trend analytics identifies trends in types of changes made to the training of computer model instances and the corresponding changes in performance/accuracy of the computer model instances, again potentially correlating types of changes in performance/accuracy with regard to different performance/accuracy parameters. These types of changes may be, for example, additions/deletions/modifications of particular types of entities present in the training data, types of changes to hyperparameters, e.g. increases/decreases in parameter values, changes to training tools used, etc., such that the automated computing tool of the illustrative embodiments may determine that particular types of changes to the training of the computer model tend to result in particular types of changes in performance/accuracy of the computer model when it is deployed for runtime use.

Thus, it can be appreciated that the present invention is specifically directed to an improved computer tool that is specifically configured to include logical structures and execute specific computer processes for addressing a problem in the computer arts, namely the training of computer models. The improved computer tool provides mechanisms that give new functionality to the improved computer tool that the computer tool did not have previously and which in turn improves the functionality of the computer models trained using the mechanisms of the improved computer tool of the present invention. That is, through operation of the improved computer tool of the present invention, the performance and accuracy of the computer models is improved.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides an improved computer tool for improving the training of computer models by tracking the changes made to the training of the computer model over multiple training instances, and correlating these changes with changes in performance/accuracy of the computer model. Analytics are executed on the tracked information to identify trends in training of the computer model, e.g., a particular change in one or more training characteristics, e.g., type of entities in the training data or other characteristic of the training data itself, a change in one or more hyperparameters, a change in the particular training algorithm or training tool used, etc., results in a difference in performance/accuracy, e.g., speed of convergence of the training of the computer model, amount of error/loss in the trained computer model, or other performance/accuracy metric.

The correlations of changes to the training characteristics with changes in performance/accuracy generate trend information that is used to generate training recommendations for training the computer model, or copies of the computer model across multiple developers at one or more locations where copies of the computer model are being trained for particular uses, e.g., the same computer model, such as a healthcare treatment recommendation model, may be developed by different developers for different purposes, e.g., training of the computer model to provide treatment recommendations for prostate cancer patients by one developer, as opposed to another copy of the computer model being trained to provide treatment recommendations for bladder cancer patients by a different developer. However, similar training recommendations may be used to assist the different developers in training their individual copies of the computer model based on identified trends in training characteristics and the corresponding trends in improvement of performance/accuracy of the computer model.

Figure 2:
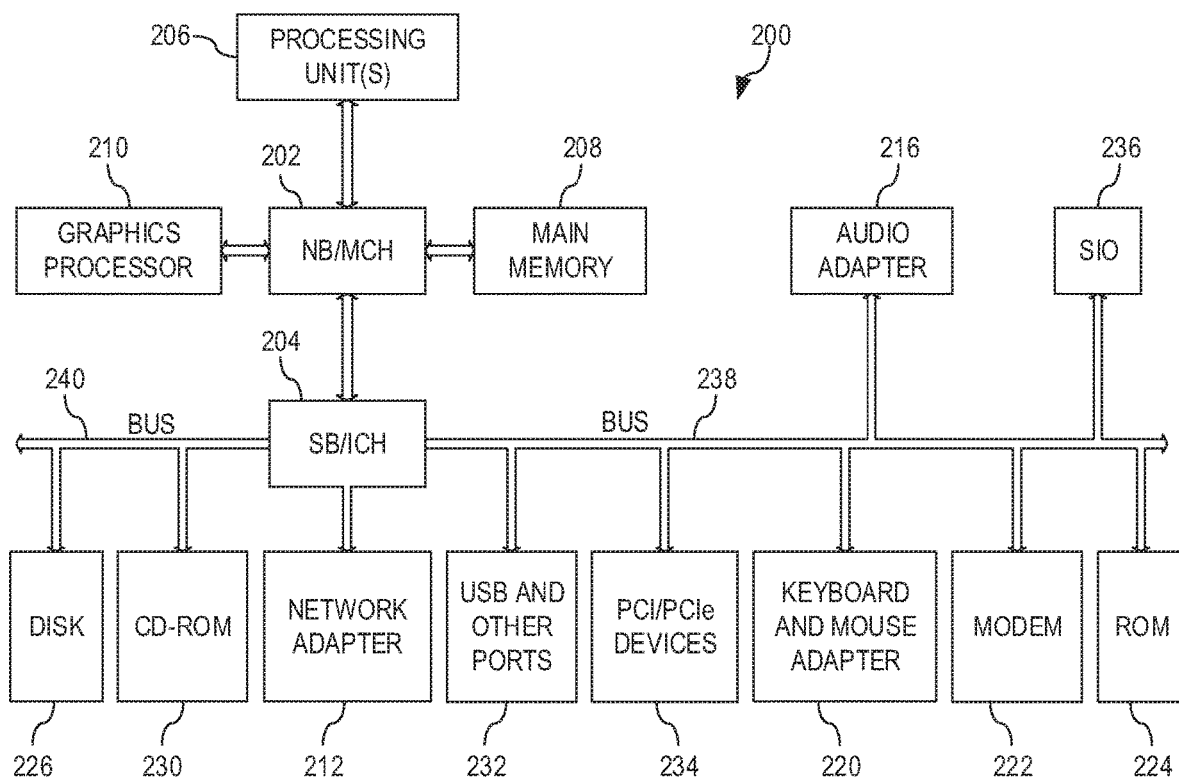
FIG. 2 is a block diagram of an example data processing system in which aspects of the illustrative embodiments are implemented.

The improved computer tool of the illustrative embodiments may be utilized in many different types of data processing environments. In order to provide a context for the description of the specific elements and functionality of the illustrative embodiments, FIGS. 1-2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a schematic diagram of one illustrative embodiment of a data processing system 100 implementing a request processing pipeline 108, which in some embodiments may be a cognitive computing system, such as a question answering (QA) computing system employing a QA pipeline 108, in a computer network 102. An example of a cognitive computing system which may be utilized as part of the data processing system 100 is the IBM Watson™ cognitive computing system available from International Business Machines (IBM) Corporation of Armonk, N.Y. The computer models themselves that are implemented in such a cognitive computing system may take many different forms and may include, for example, neural networks, regression models, time series analysis models, trend analysis models, behavioral models, simulation models, or any other type of computer model behavioral algorithm, or computer simulation that is trained through a supervised or unsupervised machine learning process by iteratively training the computer model through adjustments of training characteristics and determining changes in performance/accuracy of the trained computer model or simulation.

It should be appreciated that the cognitive computing system implementation shown in FIG. 1 is only an example, as cognitive computing systems utilize computer models to perform their cognitive computing operations. However, the present invention is applicable to any implementation in which computer models, simulations, or behavioral algorithms are trained and utilized, which includes implementations that do not require a cognitive computing system or corresponding pipeline 108.

For purposes of the present description, it will be assumed that the data processing system 100 is a cognitive computing system implemented as a QA system in which the request processing pipeline 108 is implemented as a QA pipeline that operates on structured and/or unstructured requests in the form of input questions. In operating on such structured and/or unstructured requests, one or more trained computer models are utilized that may be specific to the particular implementation of the QA system 100 and its intended purpose, e.g., generating treatment recommendations for prostate cancer patients, performing medical image diagnostics, evaluating patient electronic medical records, performing vehicle navigation or collision avoidance, providing financial product/service recommendations, etc. These computer models may be trained using a training computer system and one or more training data sets. One example of a question processing operation which may be used in conjunction with the principles described herein is described in U.S. Patent Application Publication No. 2011/0125734, which is herein incorporated by reference in its entirety.

As shown in FIG. 1, the data processing system 100, e.g., cognitive system 100, is implemented on one or more computing devices 104A-D (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-D. The network 102 includes multiple computing devices 104A-D, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 enables question processing and answer generation (QA) functionality for one or more cognitive system users via their respective computing devices 110-112. In other embodiments, the cognitive system 100 and network 102 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, sub-systems, and/or devices other than those that are depicted herein.

The cognitive system 100 is configured to implement a request processing pipeline 108 that receives inputs from various sources. The requests may be posed in the form of a natural language question, natural language request for information, natural language request for the performance of a cognitive operation, or the like. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-D on the network 102 include access points for content creators and cognitive system users. Some of the computing devices 104A-D include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus or corpora of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input questions/requests to the cognitive system 100 that are answered/processed based on the content in the corpus or corpora of data 106. In one embodiment, the questions/requests are formed using natural language. The cognitive system 100 parses and interprets the question/request via a pipeline 108, and provides a response to the cognitive system user, e.g., cognitive system user 110, containing one or more answers to the question posed, response to the request, results of processing the request, or the like. In some embodiments, the cognitive system 100 provides a response to users in a ranked list of candidate answers/responses while in other illustrative embodiments, the cognitive system 100 provides a single final answer/response or a combination of a final answer/response and ranked listing of other candidate answers/responses.

The cognitive system 100 implements the pipeline 108 which comprises a plurality of stages for processing an input question/request based on information obtained from the corpus or corpora of data 106, where one or more of these stages may implement one or more computer models to assist in performing the corresponding processing of the input question/request and/or the data obtained from the corpus or corpora of data 106. The pipeline 108 generates answers/responses for the input question or request based on the processing of the input question/request and the corpus or corpora of data 106.

As noted previously, in some illustrative embodiments, the cognitive system 100 may be the IBM Watson™ cognitive system available from International Business Machines Corporation of Armonk, N.Y. In such an illustrative embodiment, the pipeline, e.g., pipeline 108, of the IBM Watson™ cognitive system, e.g., cognitive system 100, receives an input question or request which it then parses to extract the major features of the question/request, which in turn are then used to formulate queries that are applied to the corpus or corpora of data 106. Based on the application of the queries to the corpus or corpora of data 106, a set of hypotheses, or candidate answers/responses to the input question/request, are generated by looking across the corpus or corpora of data 106 for portions of the corpus or corpora of data 106 (hereafter referred to simply as the corpus 106) that have some potential for containing a valuable response to the input question/response (hereafter assumed to be an input question). The pipeline 108 of the IBM Watson™ cognitive system then performs deep analysis on the language of the input question and the language used in each of the portions of the corpus 106 found during the application of the queries using a variety of reasoning algorithms.

The scores obtained from the various reasoning algorithms are then weighted against a statistical model that summarizes a level of confidence that the pipeline 108 of the IBM Watson™ cognitive system 100, in this example, has regarding the evidence that the potential candidate answer is inferred by the question. This process is be repeated for each of the candidate answers to generate ranked listing of candidate answers which may then be presented to the user that submitted the input question, e.g., a user of client computing device 110, or from which a final answer is selected and presented to the user. More information about the pipeline 108 of the IBM Watson™ cognitive system 100 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 100 from a client device may be posed in the form of a natural language question, the illustrative embodiments are not limited to such. Rather, the input question may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis. In the case of a healthcare based cognitive system, for example, this analysis may involve processing patient medical records, medical guidance documentation from one or more corpora, and the like, to provide a healthcare oriented cognitive system result, e.g., a diagnosis of a patient medical condition, a treatment recommendation for a patient, emphasis of anomalies in medical imaging, etc. In other contexts, such as a vehicle navigation and/or collision avoidance system, images captured from cameras and the like may be analyzed to categorize objects and determine appropriate warnings, corrective actions, e.g., braking/steering controls, etc. In context of financial evaluations, risk determinations may be made, recommendations for financial products/services may be generated, or the like. The possible cognitive operations that may be performed are numerous and it is impractical to set forth all the possibilities herein. Any cognitive operation that may be performed by a computer implemented cognitive computing system is intended to be within the spirit and scope of illustrative embodiments of the present invention.

As shown in FIG. 1, the illustrative embodiments of the present invention provide an improved computer tool 150 that is specifically directed to improving the training of computer models which may be developed for runtime use through execution in a data processing system, such as the cognitive system 100 in FIG. 1. Again, this is only an example, and the computer models, simulations, algorithms, and the like, that are trained and whose training is improved through the operation of one or more of the illustrative embodiments, are not limited to use with cognitive computing systems and may be implemented in any computing system arrangement in which computer models, simulations, algorithms are utilized. Moreover, the illustrative embodiments are specifically directed to an improved computer tool for improving the training of such computer models, simulations, algorithms, or the like, and thus, these computer models, simulations, algorithms, or the like are of a nature in which they are trained using one or more training data sets, hyperparameters, training tools, and the like, often in an iterative manner. It should be appreciated that the improved computer tool of the illustrative embodiments may comprise one or more computing devices, storage devices, memories, communication interfaces, and the like, which are further augmented, in accordance with the mechanisms of the illustrative embodiments, to include logical structures and processes implemented in specialized hardware, software executed on hardware, or any combination of specialized hardware and software executed on hardware, for implementing the computer model training computing system 150.

As shown in FIG. 1, the computer model training computing system 150 comprises a training data set trend analysis engine 152, a training tools trend analysis engine 154, a computer model (or simply "model") hyperparameter trend analysis engine 156, a model results correlation engine 158, a model instance tracking interface engine 160, a computer model training instance tracking database 162, a cross-developer trend analytics engine 164, a training recommendation engine 166, an automated recommendation implementation engine 168, and a training data set source characteristic tracking engine 170. Each of these elements of the computer model training computing system 150 may be implemented as hardware, software executed on hardware, or combinations of hardware/software implementations. The elements 152-170 operate in conjunction with one another to achieve the purposes of improving training of computer models through the identification of trends in training of the computer models, generating recommendations for improving the training of the computer models, and in some illustrative embodiments actually automatically performing the recommended operations for improving training of the computer model.

The model instance tracking interface engine 160 provides the computer logic and computer logical structures necessary to obtain information from developer workstations, other server computing devices, or the like, that are involved in implementing and developing the computer model through an iterative training process. For example, one or more client computing devices 110, 112 may operate on copies of a computer model executing on one or more servers 104C, 104D. The client computing devices 110, 112 and/or the servers 104C, 104D may provide computer interfaces, training tools, and the like, through which a user, e.g., a computer model developer, may specify the training characteristics, e.g., what training data sets to utilize, settings of hyperparameters, etc., to use when performing an iteration of training of a copy of the computer model. In developing the copies of the computer model executing on the one or more servers 104C, 104D, the developer may make changes and update the training characteristics of the copies of the computer model, e.g., by making additions/deletions/modifications in the training data sets utilized to train the corresponding copy of the computer model such that the changes affect the performance and accuracy of the computer model, by making changes to which training tools or algorithms that are utilized, by changing settings of hyperparameters used to configure the copies of the computer model during the training, or the like.

The model instance tracking interface engine 160 may operate in conjunction with agents 172, 174 present and executing in the client computing devices 110, 112 and/or the server computing devices 104C, 104D which execute the copies of the computer model, where these agents 172, 174 may monitor the particular interface, training tool, training pipeline, etc. used by the developer, and/or the developer environment to identify changes in training characteristics and the corresponding computer model results generated as a result. that collect information regarding changes in training characteristics for training the copies of the computer models, and the corresponding training results generated as a result of the changes in the training characteristics. The agents 172, 174, may report collected training information, e.g., changes in training characteristics and corresponding computer model results, to the computer model training computing system 150 via the model instance tracking interface engine 160.

It should be appreciated that an agent based embodiment is only one possible embodiment and the mechanisms of the illustrative embodiments are not limited to only those in which agents are deployed on the client computing devices 110, 112 and/or server computing devices 104C, 104D. In some illustrative embodiments, the copies of the computer models may be implemented in the servers 104A-104D in which the cognitive computing system 100 and/or the computer model training computing system 150 are implemented. For example, in some embodiments, multiple developer environments may be provided, such as virtually via virtual machines or the like, in which copies of the computer model may be executed and trained in these various developer environments. In such embodiments, agents are not required and direct monitoring of developer environments is possible. Other implementations may be utilized as well that may include any suitable mechanism for communication training information to the computer model training computing system 150 from the developer environments, without departing from the spirit and scope of the present invention.

In receiving training information, either directly from the developer environment, from the deployed agents 172, 174, or through other communication mechanisms specific to the particular implementation, the training information is tagged or otherwise associated with a particular copy of a computer model, developer, or the like. In addition, the training information may comprise version information or other indicators identifying an instance of training the copy of the computer model. That is, for example, each time a developer initiates a new instance of training the copy of the computer model, a new instance identifier, or version identifier, is generated and associated with the training instance. Thus, training information may be associated with copies of the computer model and with training instances that are used to train the copy of the computer model.

The training information tracks the training characteristics used during a training instance as well as the computer model results generated. In some illustrative embodiments, these training characteristics may be reported as the particular training characteristics, e.g., training data set utilized, training tool utilized, hyperparameter settings, etc. used during the training instance and the computer model results output by the computer model. In these illustrative embodiments, all pertinent training characteristics are reported and changes in these training characteristics from other training instances are determined in downstream analytics as discussed hereafter. In other illustrative embodiments, only changes in training characteristics are reported, with these changes being considered to be changes from a previous training instance, as may be determined from a comparison of the training instance indicators, or version indicators.

The reported training information received via the model instance tracking engine 160 is used to generate corresponding entries in the computer model training instance tracking database 162. The entries in the computer model training instance tracking database 162 may be indexed in any suitable manner, such as by identifier of copy of the computer model, by training instance indicator, by training characteristic, and/or the like. In this manner, changes to training characteristics may be tracked in the computer model training instance tracking database 162 over time as new entries for each copy of the computer model, and for each training instance, are generated and stored for application of various trend analytics to identify trends in this tracked information. For example, different training data sets may be identified from one training instance to another. The different training data sets may comprise specifications of what entities are added, deleted, or modified in the training data sets from a previous training data set, an identifier of a completely new training data set being utilized, including any additional information about the new training data set, such as source of the training data set, types of entities present in the new training data set, etc. In some cases, the training characteristic information in an entry of the computer model training instance tracking database 162 may include a pointer to a training data set and/or its metadata specifying the characteristics of the training data set, such as the types of entities included in the training data set and other characteristics, that may be compared to other training data sets to determine differences between the training data sets.

Similarly, changes in training characteristics with regard to the particular training tools utilized and/or hyperparameter settings are tracked through the storage of these training characteristics in entries of the computer model training instance tracking database 162. For example, the identification of the particular training tool, e.g., algorithms used to modify training parameters of the computer model, etc., may be stored in association with the training instance indicator. As another example, the particular settings of hyperparameters may be stored in entries corresponding to particular training instances in the computer model training instance tracking database 162. Alternatively, as noted previously, the entries in the computer model training instance tracking database 162 may instead store the actual changes made, not necessarily the particular values used, e.g., rather than storing hyperparameter X is equal to 3, instead the entry may specify that hyperparameter X was increased by 1, or in another example, rather than storing identity of the particular types of entities in the training data set that were added, deleted, modified, the entry in the database 162 may specify that entities of type A were increased by 300, entities of type B were decreased by 50, and the like.

It can be appreciated that multiple instances of training of the copies of the computer models may be tracked over time, each instance of training of the computer implemented model involves training the computer implemented model using a different training data set, different training tool, and/or different hyperparameter settings to generate a different instance of a trained computer implemented model than other instances of training of the computer implemented model. The computer methodology further includes generating computer implemented model results after each instance of training by executing the corresponding instance of the trained computer implemented model on training data of a training data set. The generated computer implemented model results, and/or differences in generated computer implemented model results from a previous training instance, may also be stored in association with the entry in the computer model training instance tracking database 162.

This computer implemented model results information is received via the model instance tracking interface engine 160 along with the other training instance information received. The computer implemented model results information and the other training characteristics information, or in some embodiments, the differences in these types of information relative to a previous training instance, are recorded in association with corresponding identifiers of the instances of trained computer implemented model.

Having obtained the training characteristics information and results information via the model instance tracking interface engine 160, and having stored corresponding entries in the computer model training instance tracking database 162, various analytics are applied to the recorded entries in the computer model training instance tracking database 162 in order to analyze recorded differences and the corresponding computer implemented model results. Based on these analytics, trends in changes in training characteristics and their corresponding changes in computer model results are identified and a corresponding output is generated indicating a correlation between the recorded differences and corresponding computer implemented model results.

The training data set trend analysis engine 152 applies analytics specifically configured and directed to identifying trends in changes in training data sets and correlating these with trends in changes to computer implemented model results, e.g., changes in performance and/or accuracy metrics. Thus, for example, the training data set trend analysis engine 152 identifies patterns in changes between training instances with regard to training data set characteristics, e.g., what types of entities are added, deleted, or modified, what sources of training data sets are utilized, etc. to identify changes over time that result in improvements/decreases in computer model performance and/or accuracy metrics. For example, through training data set trend analysis analytics, the engine 152 may determine that for a particular copy of a computer implemented model, increasing the number of medical images of type A present in the training data set results in an X amount of improvement in accuracy of the computer model with regard to predicting the presence of a particular anomaly in patient medical imaging data.

Similarly, the training tools trend analysis engine 154 applies analytics specifically configured and directed to identifying trends in changes in training tools and correlating these with trends in changes to computer implemented model results. Thus, for example, the training tools trend analysis engine 154 identifies patterns in changes between training instances with regard to the particular training tools utilized to perform the training of the computer model, i.e. what changes in computer tools or algorithms utilized to perform the training, e.g., changing from tool A to tool B, result in improvements/decreases in computer model performance and/or accuracy metrics. For example, through training tools trend analysis analytics, the engine 154 may determine that for a particular copy of a computer implemented model, using training tool or algorithm A as opposed to training tool or algorithm B results in an X amount of improvement in performance/accuracy of the computer model.

The model hyperparameter trend analysis engine 156 applies analytics specifically configured and directed to identifying trends in changes in model hyperparameter settings used for training a copy of a computer implemented model, and correlating these with trends to computer implemented model results. Thus, for example, the model hyperparameter trend analysis engine 156 identifies patterns in changes between training instances with regard to hyperparameter settings to identify changes over time that result in improvements/decreases in computer model performance and/or accuracy metrics. For example, through model hyperparameter trend analysis analytics, the engine 156 may determine that for a particular copy of a computer implemented model, increasing/decreasing/modifying a setting of a hyperparameter of the copy of the computer model results in an X amount of improvement in performance/accuracy of the computer model.

The model results correlation engine 158 correlates the trends in training characteristics identified by the various engines 152-156 with trends in computer implemented model results. Thus, changes in training characteristics are mapped to changes in computer implemented model results which then identifies potential changes in training characteristics that will result in improved/decreased computer implemented model results. This correlation may be made with regard to individual copies of computer models over multiple instances of training of the copies of computer models. Thus, these trends may be identified with regard to a first copy of the computer model, and different trends may be identified with regard to a second copy of the computer model, using these engines 152-158 and the corresponding entries in the computer model training instance tracking database 162.

The analytics executed by the various engines 152-158 are executed on top of the tracked data in the database 162 to identify trends in the training characteristics and the corresponding performance and accuracy of the copy of the computer implemented model. This process may be repeated for repeated training sessions with the computer implemented model and for different training data sets, different training tools, and different hyperparameter settings.

Thus, for example, in one illustrative embodiment, multiple instances of training of the computer implemented model are performed at least by executing a first training operation on the computer implemented model using a first version of training data and a first set of one or more hyperparameters to generate a first trained instance of the computer implemented model. The multiple instances of training of the computer implemented model are further performed by executing a second training operation on the computer implemented model using a second version of the training data and a second set of one or more hyperparameters to generate a second trained instance of the computer implemented model. Changes in the instances of training of the computer implemented model are recorded at least by generating a first tracking data structure, e.g., an entry in the database 162, that correlates a first identifier of the first training operation with the first version of training data and the first set of one or more hyperparameters, and generating, by the data processing system, a second tracking data structure that correlates a second identifier of the second training operation with the second version of training data and the second set of one or more hyperparameters. Computer implemented model results are generated at least by generating first model results from executing the first instance of the computer implemented model, and generating second model results from executing the second instance of the computer implemented model. The analysis of the recorded differences and the corresponding computer implemented model results includes performing, by the engines 152-158, analytics on the first tracking data structure, second tracking data structure, first model results, and second model results to identify differences between the first training operation and the second training operation, that correlate with differences between the first model results and the second model results.

In some cases of this illustrative embodiment, the second version of training data is a modified version of the first version of training data. For example, a developer may run the computer implemented model on new training data, which may be new version of a previous version of training data, in which entities in the training data are added, deleted, or otherwise modified, on a daily basis and may obtain updates of the accuracies of the computer implemented model which may lead to identified trends in accuracy which can be correlated with the changes in the training characteristics. Similarly, such versioning may be performed with regard to particular hyperparameter settings, training tools utilized, and the like.

The analytics applied by the various engines 152-158 may be applied to tracked training characteristic information and performance/accuracy information for individual copies of a computer model. The cross-developer trend analysis engine 164 may then apply other analytics, or similar analytics to those employed by the engines 152-158, across multiple developers and multiple copies of the computer model. For example, multiple copies of the same computer model may be distributed to different developers that develop trained copies of the computer model for the particular desired implementations and purposes of the particular customer utilizing the computer model. Trends in training characteristics and their corresponding trends in performance/accuracy of the copies of the computer models may be correlated and analyzed across these various multiple copies of the same computer model, thereby identifying how the computer model reacts to different training characteristic changes for different developer environments and developers. Thus, a macro trend analysis is made possible across developers.

Based on the identified trends, either for a single copy of a computer implemented model, or across multiple copies of the computer implemented model potentially across multiple developers, the mechanisms of the illustrative embodiments may generate training recommendations indicating how to improve the training characteristics, and thereby improve the performance/accuracy of the resulting trained copies of the computer model. The training recommendations are generated based on an analysis of the trends previously identified by the various engines 152-158, and potentially 164, by analyzing these trends to identify what changes in training characteristics increase the performance/accuracy of the copies of the computer model, e.g., including more entities like X will increase the accuracy of the computer model, removing certain entities will increase the accuracy of the computer model, setting a hyperparameter value to a particular range or value will improve the accuracy, or the like. In some cases, the training recommendations may be directed to particular architectures, such as specifying that a computer model with architecture A gives better results than computer models with architecture B.

The training recommendations may be presented via one or more graphical user interfaces (GUIs), dashboards, or the like. The GUIs or dashboards may include graphical representations of the trends identified through the analytics of the illustrative embodiments, tabular representations of such trend information, or any other representation of the trend information that is suitable to the particular implementation. In one illustrative embodiment, the GUIs or dashboards include a graph representation of the trend information in which training instances are represented as points along a graph which are selectable to obtain detailed information regarding the particular training characteristics used during the training instance. For example, along one axis, performance/accuracy of the computer model may be plotted and along another axis, time may be plotted such that the performance/accuracy of the computer model over time is represented. The points of the plotted graph represent the different training instances at different time points plotted according to the computer model results generated, i.e. the performance/accuracy metrics. It should be appreciated while simple examples may be two dimensional graphs, more complicated implementations may utilize multi-dimensional graphs in which many different performance/accuracy metrics are plotted and different training characteristics are represented.

The training recommendation engine 166 may generate and output these GUIs, dashboards, or the like, and present them to developers of computer models to assist them in understanding what changes may be made to the training characteristics of the training processes of their computer models to improve their training and thereby improve the resulting trained computer models. In some illustrative embodiments, in addition to, or alternative to, the graphical representation of the tracked training information, the training recommendation engine 166 may generate natural language or other human readable recommendations for modifying training characteristics for training instances for computer models.

In some cases, the recommendations generated by the training recommendation engine 166 may also include recommendations as to changes not to make. For example, through the trend analytics applied to the received training information, the training recommendation engine 166 may determine that there is a pattern of reduced or lower performance/accuracy of the computer model when particular types of changes to training characteristics are made. As a result of these trends, the training recommendation engine 166 may recommend that such changes that resulted in lower accuracy or performance of the computer model not be made.

In some illustrative embodiments, the recommendations generated by the training recommendation engine 166 are used by the automated recommendation implementation engine 168 to automatically implement the training recommendations. For example, the training recommendations may comprise recommendations to modify hyperparameter settings by increasing/decreasing/modifying settings of the hyperparameter. The automated recommendation implementation engine 168 may automatically modify hyperparameter settings in accordance with the training recommendation in order to perform another training instance to improve the computer model results generated by the computer model being trained. As another example, the training recommendation may specify particular training tools that tend to improve computer model results and the training tool used may be automatically changed to the identified training tool that improves computer model performance/accuracy.

In other illustrative embodiments, the training recommendation may be to modify the training data set itself and the particular composition of the training data set, e.g., what types of entities are included in the training data set, what quantities of different types of entities are present in the training data set, particular sources of training data that provide improved computer model results, etc. Based on the recommendation as to the types of entities to be included in the training data set, quantities of entity types, etc., these training data set characteristics are used as search criteria for performing an automaticy search for other training data sets in one or more training data set repositories, which may include entities that are determined to improve the accuracy and/or performance of the computer model, i.e. which match the search criteria and thus, the training recommendation. For example, as new training data sets are made available, their characteristics may be registered with the training data set source characteristics tracking engine 170. The automated search may be performed by this training data set source characteristics tracking engine 170 and the registry maintained by the training data set source characteristics tracking engine 170.

In some illustrative embodiments, the automatically identified training data sets, which are automatically identified by way of the automatic search, may be automatically retrieved by the automated recommendation implementation engine 168, and used to train the computer model. This process may be repeated until a desired accuracy or performance of the computer model is achieved or until a determination that no further improvement is possible based on the available training data sets, tools, etc., e.g., an error or loss of the computer model is equal to or below a predetermined threshold.

As mentioned above, each training instance of a computer model may be tracked along with the particular changes to training characteristics and particular computer model results generated. Thus, via this tracking, version tracking of the training data is made possible such that, if needed, previous versions of training data may be recreated. That is, a mapping of the training data formatted for use by the model, to the originally received training data, is maintained in some illustrative embodiments, over the various training instances. In this way, given the model formatted training data, the originally received training data may be recreated. Thus, the mechanisms of the illustrative embodiments can correlate a version of training data obtained from a customer with the version of data generated for consumption of the computer model, and can return to the customer data via the tracking of the versioning so that the earlier version can be reproduced.

It should be appreciated that while the example embodiments described above are with regard to trend analytics being applied to a single computer model, although potentially with regard to different copies of the same computer model being trained by different developers, the illustrative embodiments are not limited to such. To the contrary, trend analysis and training recommendation generation may be performed across different computer models depending on the desired implementation. For example, it may be determined that changes in training characteristics in one computer model may have similar effects in the training of other computer models and thus, cross-computer model trend analysis and training recommendations may be generated by the mechanisms of the illustrative embodiments. In such a case, the trend analysis may be performed with regard to different entries in the database 162 associated with different computer models.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
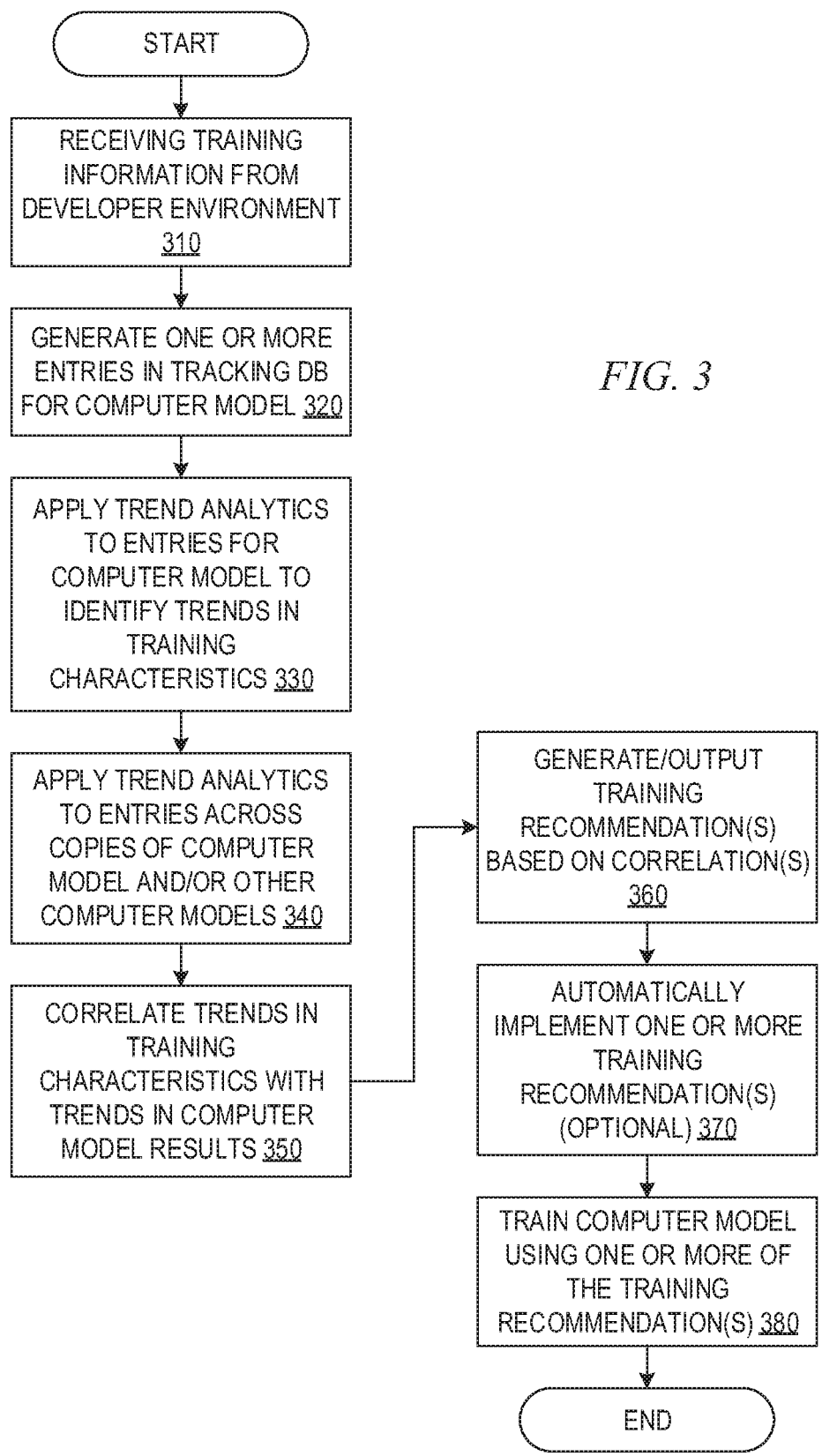
FIG. 3 is a flowchart outlining an example operation of a computer model training computing system in accordance with one illustrative embodiment.

FIG. 3 is a flowchart outlining an example operation of a computer model training computing system in accordance with one illustrative embodiment. As shown in FIG. 3, the operation starts by receiving training information from a developer environment, e.g., client/server computing system implemented developer environment, for one or more training instances of a copy of a computer model (step 310). As mentioned previously, in some illustrative embodiments, this obtaining of training information may be facilitated by the use of agents present and executing within or on conjunction with the developer environment, directly from the developer environment, or through any other suitable mechanism for obtaining such data from the developer environment in which a developer is training the copy of the computer model.

Based on the received training information, one or more corresponding entries are generated in the computer model training instance tracking database for the copy of the computer model (step 320). As noted previously, the entry may be indexed based on one or more different identifiers or indicators, such as a training instance indicator, an indicator of the copy of the computer model, and/or the like.

One or more trend analytics are applied to the entries in the computer model training instance tracking database for the copy of the computer model to identify trends in training characteristics (step 330). In addition, one or more trend analytics are applied to entries in the computer model training instance tracking database across copies of the computer model, and/or different copies of different models, to identify trends training characteristics across computer models (step 340). The trends in training characteristics identified are correlated with trends in computer model results (step 350).

Based on the trends in training characteristics correlated with trends in computer model results, one or more training recommendations for improving the training of the copy of the computer model are generated and output to a developer or other authorized user responsible for developing a copy of the computer model (step 360). Optionally, the training recommendation(s) may be automatically implemented by performing corresponding computer operations to modify training characteristics in accordance with the training recommendation(s) (step 370). This may include, for example, modifying settings of hyperparameters, modifying content of training data sets, obtaining new training data sets from particular training data set sources, modifying training tools utilized, or the like.

Whether implemented automatically, or through manual modification based on the output of the training recommendation to the developer, the copy of the computer model is trained using one or more of the training recommendations (step 380). The operation then terminates.

As described previously, the training recommendations generated by the mechanisms of the illustrative embodiments based on the trend analysis performed on the training characteristics and corresponding computer model results. The output of these training recommendations may be presented in various different ways including as graphical user interfaces and dashboards in which the trends are represented as graphs correlating computer model performance/accuracy with training characteristics of various training instances of a copy of the computer model, or across multiple copies of the computer model or different computer models, over time. In some illustrative embodiments, the dashboard may be represented in tabular format in which one or more columns of the tabular output represents the trends in computer model performance/accuracy, one or more columns represent training characteristic information, and one or more other columns represent other types of information specific to the training instance of the copy of the computer model.

FIG. 4 is an example diagram of a dashboard representation of training information in accordance with one illustrative embodiment. As shown in FIG. 4, the dashboard representation is in the form of a table in which rows of the table represent different computer models and columns represent the various training instance information and trend information for the training instance. The "Details" column includes user selectable elements which, when selected by the user, generates detailed information about the training data used to train the corresponding model. The "Trend" column includes user selectable elements which, when selected by the user, generates an output indicating trends in training the corresponding model.

Figure 5:
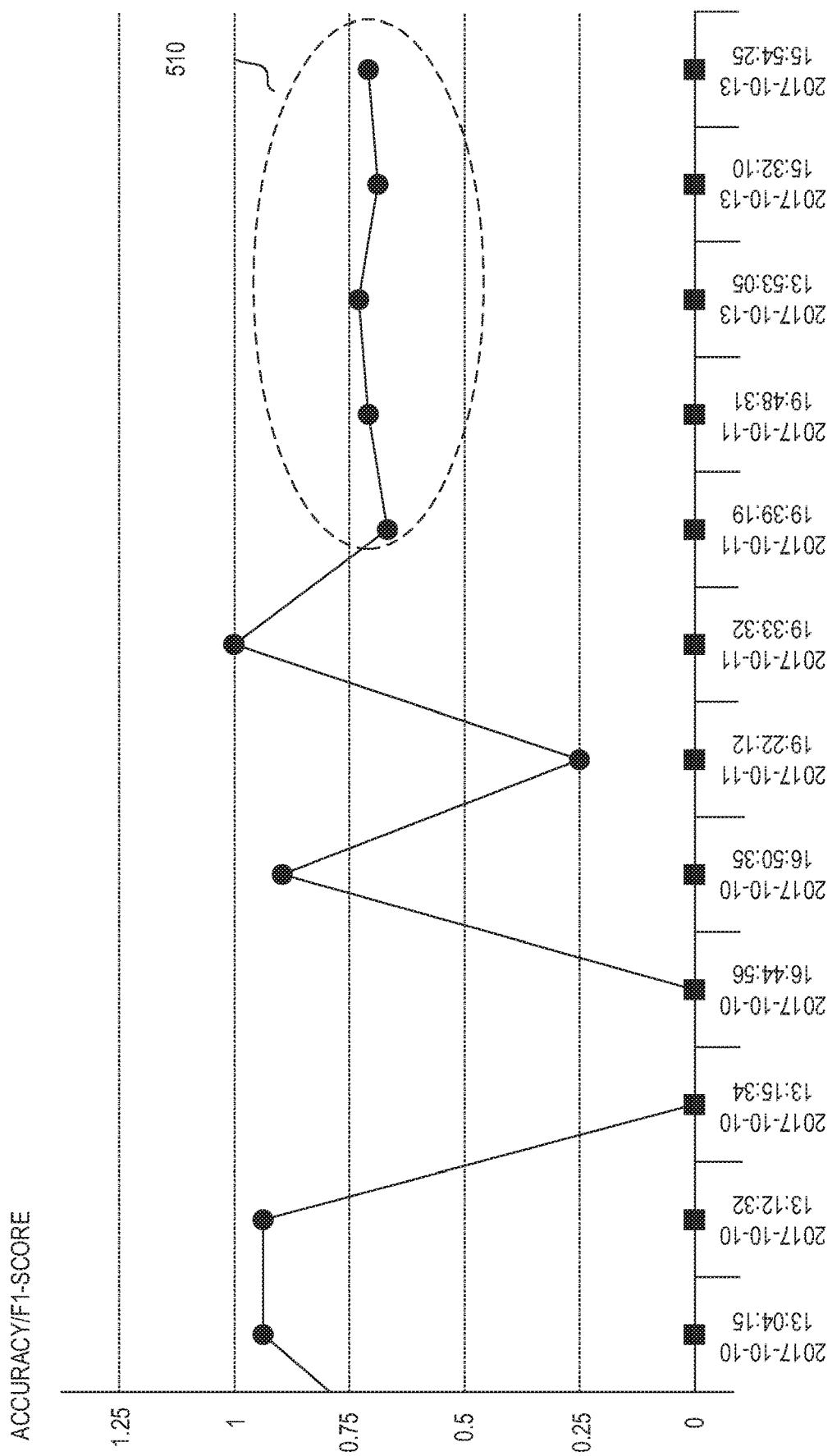
FIG. 5 is an example diagram of a graphical representation of trends of the training of a copy of a computer model in accordance with one illustrative embodiment.

FIG. 5 is an example diagram of a graphical representation of trends of the training of a copy of a computer model in accordance with one illustrative embodiment. As shown in FIG. 5, the graphical representation comprises a vertical axis representing the accuracy of the computer model output and a horizontal axis representing a time series. The points along the lines represent training instances for the copy of the computer model with the lines between these points representing the trends in computer model performance. The points in the graphical representation are user selectable such that when a user selects the corresponding point, a combination of the training data version, training tools, hyperparameters, and other training characteristics may be presented for viewing by the developer. From this representation of the training characteristics, the developer is able to see what combination of training characteristics may lead to increases/decreases in computer model performance/accuracy, which training characteristics result in anomalous increases/decreases, and the like. When trending is more smoothly represented in the graphical representation with a desired performance/accuracy, such as in region 510 in the depicted example, the developer may identify the corresponding training characteristics and utilize those to obtain improved performance/accuracy of the computer model through appropriate setting of the training characteristics.

FIG. 6 is an example diagram of the tabular representation of the training model characteristics and training dataset characteristics, with FIG. 5 above representing the accuracy trend over a plurality of models. That is, in FIG. 5, each dot represents a computer model instance with the edge representing the trend in accuracy, e.g., increasing/decreasing. Based on whether the curve in FIG. 5 is increasing or decreasing (each dotted edge in FIG. 5 being a model), model developers may revert back to training characteristics specified for the model instance that provides greater accuracy. Each point along the curve in the graph shown in FIG. 5 may have its own corresponding version of the tabular information shown in FIG. 6 and which may be used to specify the training characteristics for the particular instance of the computer model.

Thus, with the mechanisms of the illustrative embodiments, an improved computer tool is provided for training a computer implemented model, where this improved computer tool is implemented in a data processing system that is specifically configured to perform an ordered combination of computer specific operations to train a computer implemented model and track the changes made to the training characteristics as well as correlate those changes made to the training characteristics with changes in the performance/accuracy metrics. The improved computer tool further provides computer specific operations that identify trends in the tracked information and which perform analysis to generate recommendations for improving the training of the computer implemented model and/or automatically implementing the generated recommendations for improving the training of the computer implemented model.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for training a computer implemented model, comprising:
   performing, by the data processing system, multiple instances of training of the computer implemented model, wherein each instance of training of the computer implemented model comprises training the computer implemented model using a different training data set to generate a different instance of a trained computer implemented model;
   generating computer implemented model results after each instance of training by executing the corresponding instance of the trained computer implemented model;
   recording, by the data processing system, differences in the instances of training of the computer implemented model in association with corresponding identifiers of the instances of trained computer implemented model and corresponding computer implemented model results;

analyzing, by the data processing system, the recorded differences and the corresponding computer implemented model results; and generating, by the data processing system, an output indicating a correlation between recorded differences and corresponding computer implemented model results, wherein the analyzing comprises performing a trend analysis on the recorded differences and the corresponding computer implemented model results, wherein the trend analysis comprises:

a training data set trend analysis that identifies first trends in changes in entities present in the training data sets, and correlates these first trends with trends in computer implemented model performance;

a training tools trend analysis that identifies second trends in changes in training algorithms used to train the instances of the computer implemented model, and correlates these second trends with the trends in computer implemented model performance; and model hyperparameter trend analysis that identifies third trends in changes in model hyperparameter settings, and correlates these third trends with the trends in computer implemented performance, and wherein generating an output comprises generating a recommendation output, based on the training data set trend analysis, training tools trend analysis, and model hyperparameter trend analysis, recommending at least one of a change in entities present in the training data sets to make to improve performance of the computer implemented model, a change in training tools to make to improve performance of the computer implemented model, or a change in model hyperparameter settings to make to improve performance of the computer implemented model.

2. The method of claim 1, wherein performing multiple instances of training of the computer implemented model comprises:

executing, by the data processing system, a first training operation on the computer implemented model using a first version of training data and a first set of one or more hyperparameters to generate a first trained instance of the computer implemented model; and executing, by the data processing system, a second training operation on the computer implemented model using a second version of the training data and a second set of one or more hyperparameters to generate a second trained instance of the computer implemented model.

3. The method of claim 2, wherein recording changes in the instances of training of the computer implemented model comprises:

generating, by the data processing system, a first tracking data structure that correlates a first identifier of the first training operation with the first version of training data and the first set of one or more hyperparameters; and generating, by the data processing system, a second tracking data structure that correlates a second identifier of the second training operation with the second version of training data and the second set of one or more hyperparameters.

4. The method of claim 3, wherein generating computer implemented model results comprises:

generating first model results from executing the first instance of the computer implemented model; and generating second model results from executing the second instance of the computer implemented model, and wherein analyzing the recorded differences and the corresponding computer implemented model results comprises performing, by the data processing system, analytics on the first tracking data structure, second tracking data structure, first model results, and second model results to identify differences between the first training operation and the second training operation, that correlate with differences between the first model results and the second model results.

5. The method of claim 2, wherein the second version of training data is a modified version of the first version of training data.

6. The method of claim 1, wherein generating the output further comprises:

generating one or more recommendations for modifying training of the computer implemented model to improve training data by identifying what changes increase the accuracy of the computer implemented model based on the recorded differences and corresponding computer implemented model results.

7. The method of claim 6, further comprising:

automatically executing computer operations to implement the generated one or more recommendations, wherein the computer operations comprise at least one of obtaining new training data comprising entities specified in the one or more recommendations as entities that improve training of the computer implemented model, removing entities, specified in the one or more recommendations as entities that degrade training of the computer implemented model, modifying at least one hyperparameter of the computer implemented model, or modifying a computer model training tool used to perform training of the computer implemented model.

8. The method of claim 1, further comprising:

tracking instances of training data used to train the computer implemented model so that training data used to train the computer implemented model may be reverted back to a previous version of training data.

9. A computer program product comprising a computer readable storage medium having a computer readable program stored therein, wherein the computer readable program, when executed on a data processing system, causes the data processing system to:

perform multiple instances of training of the computer implemented model, wherein each instance of training of the computer implemented model comprises training the computer implemented model using a different training data set to generate a different instance of a trained computer implemented model;

generate computer implemented model results after each instance of training by executing the corresponding instance of the trained computer implemented model;

record differences in the instances of training of the computer implemented model in association with corresponding identifiers of the instances of trained computer implemented model and corresponding computer implemented model results;

analyze the recorded differences and the corresponding computer implemented model results; and generate an output indicating a correlation between recorded differences and corresponding computer implemented model results, wherein the analyzing comprises performing a trend analysis on the recorded differences and the corresponding computer implemented model results, wherein the trend analysis comprises:

a training data set trend analysis that identifies first trends in changes in entities present in the training data sets, and correlates these first trends with trends in computer implemented model performance;

a training tools trend analysis that identifies second trends in changes in training algorithms used to train the instances of the computer implemented model, and correlates these second trends with the trends in computer implemented model performance; and model hyperparameter trend analysis that identifies third trends in changes in model hyperparameter settings, and correlates these third trends with the trends in computer implemented performance, and wherein generating an output comprises generating a recommendation output, based on the training data set trend analysis, training tools trend analysis, and model hyperparameter trend analysis, recommending at least one of a change in entities present in the training data sets to make to improve performance of the computer implemented model, a change in training tools to make to improve performance of the computer implemented model, or a change in model hyperparameter settings to make to improve performance of the computer implemented model.

10. The computer program product of claim 9, wherein the computer readable program further causes the data processing system to perform multiple instances of training of the computer implemented model at least by:

executing a first training operation on the computer implemented model using a first version of training data and a first set of one or more hyperparameters to generate a first trained instance of the computer implemented model; and executing a second training operation on the computer implemented model using a second version of the training data and a second set of one or more hyperparameters to generate a second trained instance of the computer implemented model.

11. The computer program product of claim 10, wherein the computer readable program further causes the data processing system to record changes in the instances of training of the computer implemented model at least by:

generating a first tracking data structure that correlates a first identifier of the first training operation with the first version of training data and the first set of one or more hyperparameters; and generating a second tracking data structure that correlates a second identifier of the second training operation with the second version of training data and the second set of one or more hyperparameters.

12. The computer program product of claim 11, wherein the computer readable program further causes the data processing system to generate computer implemented model results at least by:

generating first model results from executing the first instance of the computer implemented model; and generating second model results from executing the second instance of the computer implemented model, and wherein analyzing the recorded differences and the corresponding computer implemented model results comprises performing, by the data processing system, analytics on the first tracking data structure, second tracking data structure, first model results, and second model results to identify differences between the first training operation and the second training operation, that correlate with differences between the first model results and the second model results.

13. The computer program product of claim 10, wherein the second version of training data is a modified version of the first version of training data.

14. The computer program product of claim 9, wherein the computer readable program further causes the data processing system to generate the output at least by:

generating one or more recommendations for modifying training of the computer implemented model to improve training data by identifying what changes increase the accuracy of the computer implemented model based on the recorded differences and corresponding computer implemented model results.

15. The computer program product of claim 14, wherein the computer readable program further causes the data processing system to:

automatically execute computer operations to implement the generated one or more recommendations, wherein the computer operations comprise at least one of obtaining new training data comprising entities specified in the one or more recommendations as entities that improve training of the computer implemented model, removing entities, specified in the one or more recommendations as entities that degrade training of the computer implemented model, modifying at least one hyperparameter of the computer implemented model, or modifying a computer model training tool used to perform training of the computer implemented model.

16. The computer program product of claim 9, wherein the computer readable program further causes the data processing system to track instances of training data used to train the computer implemented model so that training data used to train the computer implemented model may be reverted back to a previous version of training data.

17. An apparatus comprising:

a processor; and a memory coupled to the processor, wherein the memory comprises instructions which, when executed by the processor, cause the processor to:

perform multiple instances of training of the computer implemented model, wherein each instance of training of the computer implemented model comprises training the computer implemented model using a different training data set to generate a different instance of a trained computer implemented model;

generate computer implemented model results after each instance of training by executing the corresponding instance of the trained computer implemented model;

record differences in the instances of training of the computer implemented model in association with corresponding identifiers of the instances of trained computer implemented model and corresponding computer implemented model results;

analyze the recorded differences and the corresponding computer implemented model results; and generate an output indicating a correlation between recorded differences and corresponding computer implemented model results, wherein the analyzing comprises performing a trend analysis on the recorded differences and the corresponding computer implemented model results, wherein the trend analysis comprises:

a training data set trend analysis that identifies first trends in changes in entities present in the training data sets, and correlates these first trends with trends in computer implemented model performance;

a training tools trend analysis that identifies second trends in changes in training algorithms used to train the instances of the computer implemented model, and correlates these second trends with the trends in computer implemented model performance; and model hyperparameter trend analysis that identifies third trends in changes in model hyperparameter settings, and correlates these third trends with the trends in computer implemented performance, and wherein generating an output comprises generating a recommendation output, based on the training data set trend analysis, training tools trend analysis, and model hyperparameter trend analysis, recommending at least one of a change in entities present in the training data sets to make to improve performance of the computer implemented model, a change in training tools to make to improve performance of the computer implemented model, or a change in model hyperparameter settings to make to improve performance of the computer implemented model.

\* \* \* \* \*